United States Patent
Kucera et al.

(10) Patent No.: US 10,630,815 B2
(45) Date of Patent: Apr. 21, 2020

(54) CONVERSION BETWEEN TRANSMISSION CONTROL PROTOCOLS

(71) Applicant: NOKIA TECHNOLOGIES OY, Espoo (FI)

(72) Inventors: Stepan Kucera, Dublin (IE); Khaled Yasser Mohamed, Dublin (IE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/290,088

(22) Filed: Mar. 1, 2019

(65) Prior Publication Data

US 2019/0273812 A1 Sep. 5, 2019

(30) Foreign Application Priority Data

Mar. 1, 2018 (FI) ...................................... 20185196

(51) Int. Cl.
  *H04L 29/06* (2006.01)
  *H04L 29/08* (2006.01)
(52) U.S. Cl.
  CPC .............. *H04L 69/18* (2013.01); *H04L 67/28* (2013.01); *H04L 69/08* (2013.01); *H04L 69/14* (2013.01); *H04L 69/22* (2013.01)
(58) Field of Classification Search
  None
  See application file for complete search history.

(56) References Cited

U.S. PATENT DOCUMENTS

| | | | |
|---|---|---|---|
| 2012/0093150 A1* | 4/2012 | Kini | H04L 45/24 370/389 |
| 2014/0195797 A1* | 7/2014 | du Toit | H04L 63/168 713/152 |
| 2014/0351447 A1* | 11/2014 | Annamalaisami | H04L 65/1069 709/227 |
| 2015/0095502 A1* | 4/2015 | Le Bolzer | H04L 45/24 709/227 |
| 2015/0201046 A1 | 7/2015 | Biswas | |
| 2015/0263959 A1* | 9/2015 | Patwardhan | H04L 47/193 370/235 |
| 2016/0212759 A1* | 7/2016 | Schliwa-Bertling | H04L 69/14 |
| 2016/0261722 A1 | 9/2016 | Paasch et al. | |
| 2016/0277247 A1* | 9/2016 | Kim | H04L 41/0826 |

(Continued)

OTHER PUBLICATIONS

RFC 6824—TCP Extensions for Multipath Operation with Multiple Addresses (Year: 2013).*

(Continued)

*Primary Examiner* — Jeffrey M Rutkowski
*Assistant Examiner* — Andre Tacdiran
(74) *Attorney, Agent, or Firm* — Squire Patton Boggs (US) LLP

(57) ABSTRACT

There is provided a method and an apparatus for converting a packet of a first transmission protocol into a packet of a second transmission control protocol, wherein one of the first transmission control protocol and the second transmission control protocol is multipath transmission control protocol (MPTCP) and the other is transmission control protocol (TCP), wherein the converting comprises: obtaining a sequence number indicated in a first header element of the first packet, and copying the obtained sequence number into a second header element of the second packet.

12 Claims, 9 Drawing Sheets

(56) References Cited

U.S. PATENT DOCUMENTS

| | | | |
|---|---|---|---|
| 2016/0315976 A1* | 10/2016 | Detal | H04L 65/1069 |
| 2017/0085484 A1* | 3/2017 | Hellander | H04L 69/14 |
| 2017/0156078 A1 | 6/2017 | Lee et al. | |
| 2017/0208104 A1* | 7/2017 | Wei | H04L 29/06 |
| 2017/0223148 A1* | 8/2017 | Roeland | H04L 12/66 |
| 2018/0062979 A1* | 3/2018 | Zee | H04W 80/06 |
| 2018/0103123 A1* | 4/2018 | Skog | H04L 67/142 |
| 2019/0182363 A1* | 6/2019 | Bonaventure | H04L 12/66 |

OTHER PUBLICATIONS

Communication of Acceptance under section 29a of Patents Decree dated Sep. 13, 2018 corresponding to Finnish Patent Application No. 20185196.

* cited by examiner

CONVERSION BETWEEN TRANSMISSION CONTROL PROTOCOLS

TECHNICAL FIELD

The invention relates to communications.

BACKGROUND

In modern networks, data transmission capacity need continues to increase in the future. Different solutions for increasing the capacity have been proposed. One may be the use of so called Multi-path Transmission Control Protocol (MPTCP) which utilizes a plurality of TCP subflows. However, not all devices support MPTCP and thus there is a need to provide solutions that enable systems utilizing both MPTCP and TCP devices.

BRIEF DESCRIPTION

According to an aspect, there is provided the subject matter of the independent claims.

Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which FIGS. 1A, 1B, 1C, and 1D illustrate example systems to which embodiments may be applied to;

DETAILED DESCRIPTION OF SOME EMBODIMENTS

Figure 1A:
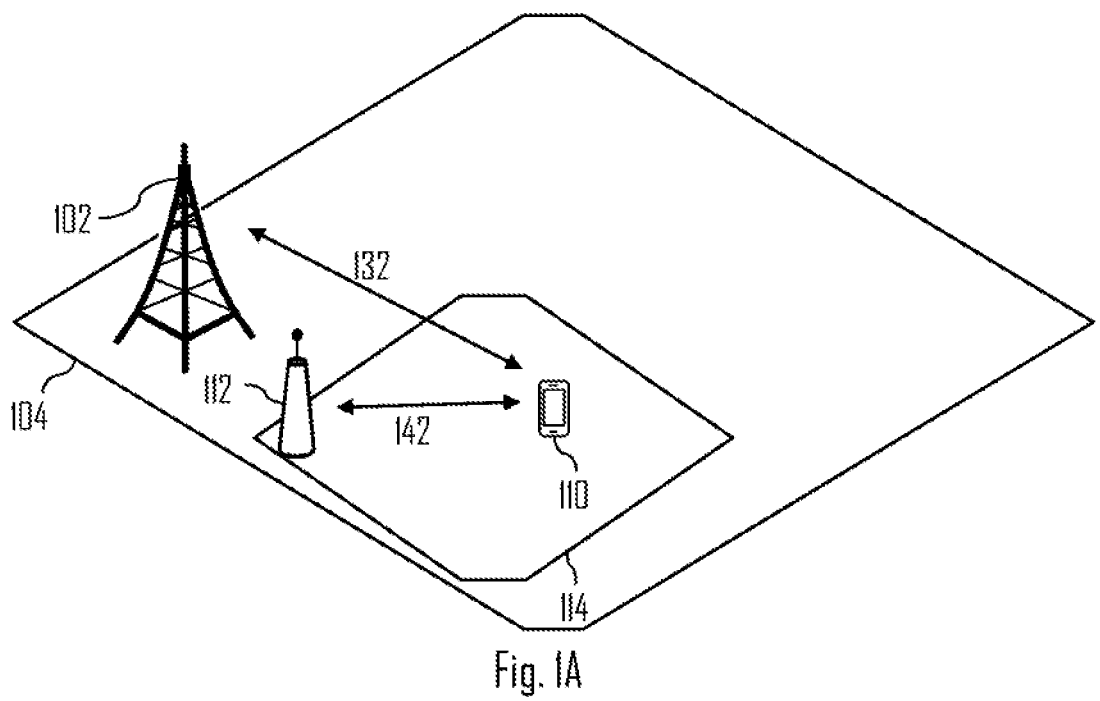

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), and/or LTE-Advanced.

Another example of a suitable communications system is the 5G concept. 5G is likely to use multiple input—multiple output (MIMO) techniques (including MIMO antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 1B:
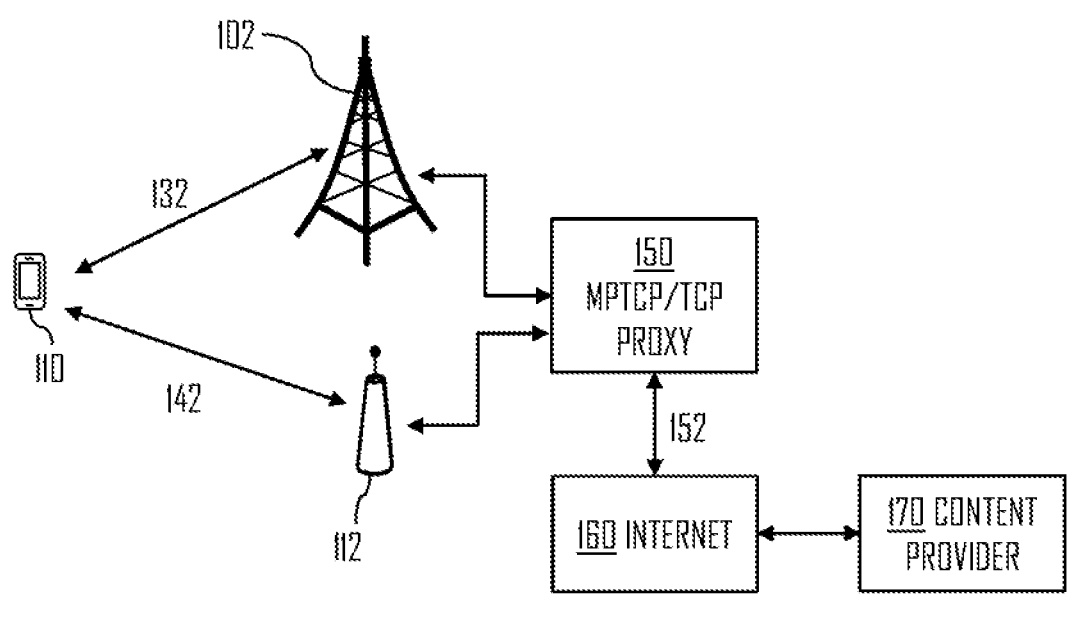

FIGS. 1A and 1B illustrate some examples of wireless systems to which embodiments may be applied. Referring to FIG. 1A, wireless communication networks, such as the Long Term Evolution (LTE), the LTE-Advanced (LTE-A) of the $3^{rd}$ Generation Partnership Project (3GPP), WLAN, or the predicted future 5G solutions, are typically composed of at least one network element, such as a network element 102, providing at least one cell, such as cell 104. In the example of FIG. 1A, cells 104, 114 are shown. The cell 114 may be provided by a network element 112, for example. The cell 104 may be provided by the network element 102. It is, however, possible that a network element of the wireless radio system provides more than one cell. Thus, for example, the network element 102 may provide the cell 104 and the cell 114. In general, the system may comprise one or more network elements, wherein each network element provides one or more cells providing service to one or more terminal devices in the cells.

Each cell of the radio communication network may be, e.g., a macro cell, a micro cell, a femto, or a pico-cell, for example, meaning that there may be one or more of each of the described cells. Each network element of the radio communication network, such as the network elements 102, 112, may be an evolved Node B (eNB) as in the LTE and LTE-A, a radio network controller (RNC) as in the UMTS, a base station controller (BSC) as in the GSM/GERAN, or any other apparatus capable of controlling wireless communication and managing radio resources within a cell or cells. That is, there may be one or more of each of the described apparatuses or entities.

For 5G solutions, the implementation may be similar to LTE-A, as described above. The network elements 102, 112 may be base station(s) or a small base station(s), for example. In the case of multiple eNBs in the communication network, the eNBs may be connected to each other with an X2 interface as specified in the LTE. Other communication methods between the network elements may also be possible depending on the implementation and used radio communication protocol(s).

The wireless system may further comprise at least one terminal device 110 to which the one more network elements 102, 112 may provide communication services. The cells 104, 114 may provide service for the at least one terminal device 110, wherein the at least one terminal device 110 may be located within or comprised in at least one of the cells 104, 114. The at least one terminal device 110 may communicate with the network elements 102, 112 using communication link(s) 132, 142, which may be understood as communication link(s) for end-to-end communication, wherein source device transmits data to the destination device. The at least one terminal device 110 may comprise mobile phones, smart phones, tablet computers, laptops, Machine Type Communication (MTC) devices and other devices used for communication with the wireless communication network.

Still referring to FIG. 1A, the wireless system may comprise, in addition to one or more cellular network elements (e.g. network element 102), one or more access points (AP) 112. That is, in general, the wireless system may comprise, for example, one or more eNBs 102 and one or more APs 112. The AP(s) 112 may provide wireless communication according to wireless communication protocol(s), such as according to WLAN specifications and/or cellular communication specifications. That is, for example, AP 112 may act as a regular WLAN AP and/or as an AP for providing aggregated communication with one or more network elements 102 of a cellular network. WLAN may sometimes be referred to as Wi-Fi or WiFi.

Utilizing at least two different techniques in the wireless system may enable the terminal device 110 to communicate with the wireless system using at least two different communication links 132, 142 to uplink and/or downlink directions. It may, however, be possible that the communication paths utilize the same communication technology (e.g. cellular). One example of such may be the so called IETF-standardized multi-path transport control protocol (MPTCP) which may be used to aggregate the capacity of multiple radio access technologies (e.g. LTE and WiFi) to a single data flow (e.g. WebEx) and in that way improve the quality of user experience. In such case the links 132, 142 may be understood as subflows 132, 142 of the MPTCP connection or session.

Referring to FIG. 1B, the MPTCP capable terminal device 110 (also referred to simply as MPTCP-capable user equipment (UE) 110 or MPTCP-UE 110 or simply UE 100) may communicate with the wireless communication system using two different communication paths 132, 142. For example, one of the communication paths may utilize cellular interface and the other WiFi interface which both may be supported by a communication circuitry of the UE 110. In the example, MPTCP may have two subflows, i.e. via path 132 and via path 142. However, it may be possible that the content provider 170 (e.g. WebEx) may only support TCP based communication and not MPTCP based communication which may have multiple TCP subflows as discussed. Hence, the system may utilize so called MPTCP/TCP proxy 150 which may be configured to change MPTCP flows to TCP flows and vice versa between the UE 110 and content provider 170 accessible via internet 160, for example. Essentially, a specific MPTCP proxy 150 may be used to convert or translate the multi-path MPTCP flows 132, 142 into single-path TCP flow 152 as the content provider 170 may not support the MPTCP flows 132, 142 directly. Such solutions, may also convert TCP flows to MPTCP flows by generating MPTCP and TCP packets independently, only by using complex state-full multi-packet analysis of each individual flow. As a result, conventional MPTCP/TCP proxies (e.g. proxy 150) may not scale in terms of achievable capacity and/or supported number of UEs and users.

Figure 1C:
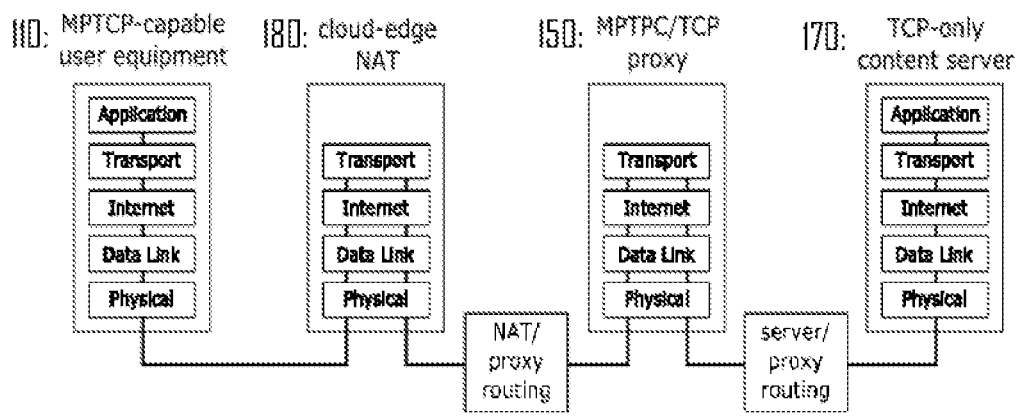

One example of used MPTCP proxy 150 based solution may be shown in the example of FIG. 1C. UE 110 may communicate utilizing MPTCP flows with TCP-only content server 170 (i.e. content provider that only supports TCP and not MPTCP). This may be enabled by the use of the proxy 150 between the server 170 and a Network Address Translation (NAT) 180 (e.g. cloud-edge NAT 180). Generally, the use of NAT enables translation of first type of Internet Protocol (IP) address to a second type of IP address, and vice versa. For example, private network IP address may be changed to public IP address based on relationship table at the NAT 180. So, basically, the proxy 150 may receive MPTCP flows from the NAT 180 and change these flows to TCP flow which can be processed by the server 170. On the other hand, the proxy 150 may take TCP flow as an input and provide MPTCP subflows (e.g. two flows) to the NAT 180 which may further forward these flows to the UE 110 according to the routing instructions at the NAT 180. For example, the proxy 150 may be a virtual machine (e.g. Linux virtual machine than handles the conversion of payload data between MPTCP and TCP.

There may be some drawbacks to this approach: first of, the solution may require lots of resources and be quite complex as the proxy 150 may need to implement full protocol functionality including the (MP)TCP congestion control on both sides of the connection (e.g. 132, 142 and 152. Second, packets may need to be first routed to the MPTCP/TCP proxy 150, processed and then routed to the server 170. This may cause additional delay as all traffic may need to pass through the proxy 150. Third, to enable service scaling under varying traffic load intensity, the proxy 150 may need to be implemented as a set of virtual proxy instances to which ingress traffic is distributed by a load balancer. Yet multi-connectivity load balancing may be difficult and may require additional infrastructure (i.e. further cloud computing resources) as the load balancer may need to recognize TCP subflows (e.g. flows using paths 132, 142) belonging to the same MPTCP connection and map them to the same proxy virtual machine.

Figure 1D:
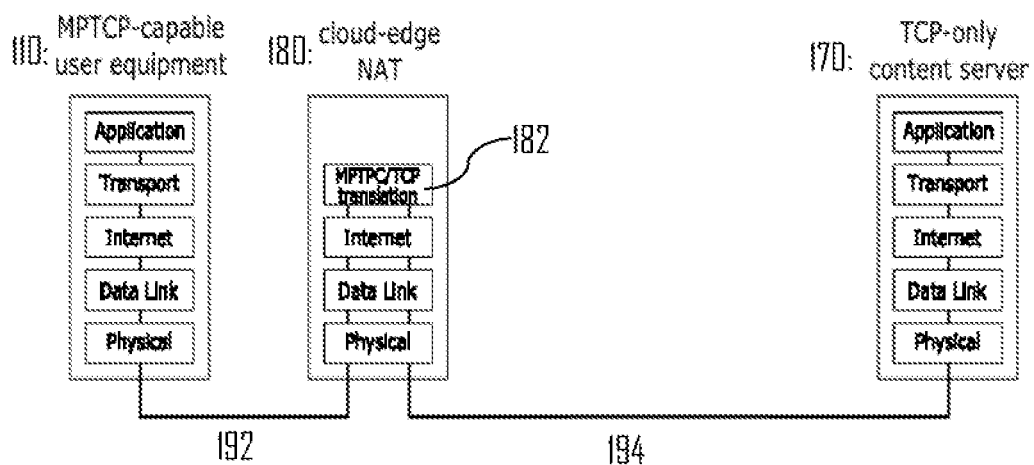

Therefore, there is provided a solution which may be utilized to enable MPTCP/TCP conversion to enable communication between MPTCP capable devices and non- MPTCP capable devices. One example of such is shown in FIG. 1D illustrating an embodiment. Referring to FIG. 1D, the NAT 180 may obtain subflows of a MPTCP connection 192. The NAT 180 may comprise a MPTCP/TCP conversion or translation function 182 configured to convert the subflows of the MPTCP connection 192 into single TCP connection 194. Hence, proxy 150 may not be needed anymore, and thus the TCP connection may be configured directly between the NAT 180 and the server 170 without the proxy 150. This may, at least, reduce latency in the wireless communication system. It is also pointed out that the conversion may be performed to the other direction, i.e. from TCP connection 194 into plurality of subflows of a MPTCP connection 192. I.e. the MPTCP/TCP conversion function 182 may convert MPTCP flows into a TCP flow and the other way around as will be discussed below in more detail. For example, the MPTCP connection 192 may utilize the connections 132 and 142 for the subflows.

Figure 2:
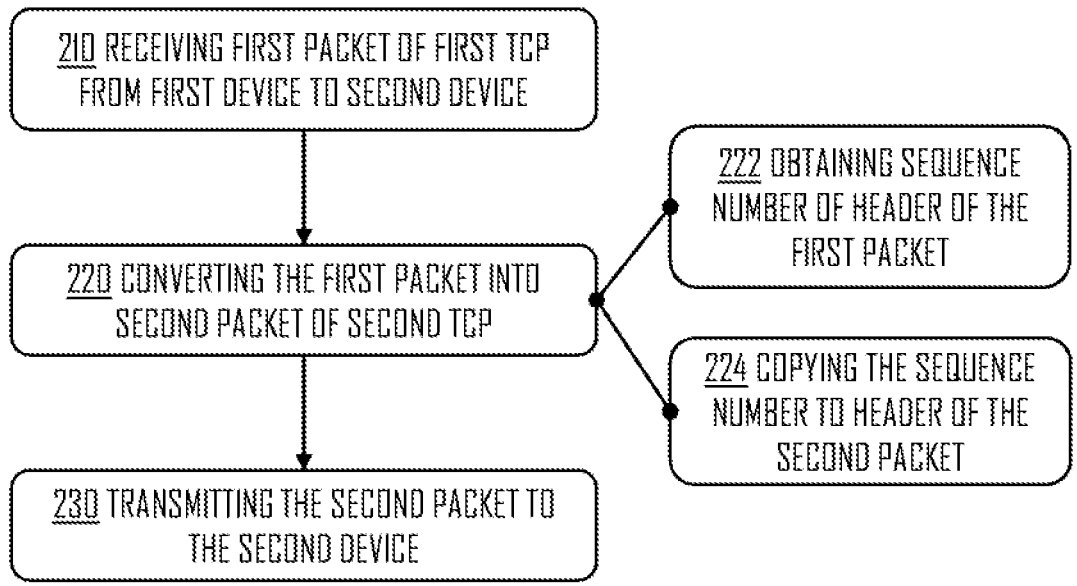
FIG. 2 illustrates a flow diagram according to an embodiment.

FIG. 2 illustrates a flow diagram according to an example embodiment. Referring to FIG. 2, a network element for forwarding packets between an MPTCP capable device and a non-MPTCP capable device, receives a first packet of a first transmission control protocol from a first device targeted to a second device (block 210); converts the first packet into a second packet of a second transmission control protocol, wherein one of the first transmission control protocol and the second transmission control protocol is MPTCP and the other is TCP (block 220); and transmits or forwards (block 230) the converted second packet to the second device.

The converting in block 220 may further comprise: obtaining, by said network element, a sequence number indicated in a first header element (header elements may also be referred to as header fields) of the first packet (block 222), and copying, by said network element, the obtained sequence number into a second header element of the second packet (block 224).

The network element performing the steps of FIG. 2 and embodiments described below may be or may implement a MPTCP/TCP converter or translator function, such as a MPTCP/TCP converter VNF. However, said network element may be a physical apparatus configured to perform said functions (e.g. the network element 400 discussed later in more detail). According to an example embodiment, said network element is or is comprised in the NAT 180 or some other NAT. Hence, the NAT 180 may implement the functions of the proposed solution, and the use of the proxy 150 may be avoided, for example.

Converting between MPTCP and TCP may also be expressed as converting between multi-path TCP and non-multipath TCP (i.e. single-path TCP). So, in the context of this description, TCP may be understood as single-path TCP and MPTCP as multi-path TCP (i.e. supporting more than a single path or single subflow). Hence, MPTCP and TCP may be logically different.

According to an embodiment, the first header element is logically different to the second header element. This may simply mean that the sequence number is obtained from a header element (i.e. first header element) that is different than the header element (i.e. second header element) to which the sequence number is copied to. So, the sequence number is obtained from a header element comprising the sequence number of the packet to be converted and copied to another header element to indicate the sequence number. Basically, there can be different options from which to select depending on implementation. However, later some specific examples are described. It is also noted that although the header elements or fields may be logically different, they may be similar at least in the respect that they both are configured to carry sequence numbers in one form or the other. However, the logically different may refer to the situation that the sequence number obtained from a sequence number field is not copied to the same sequence number field of another packet, but to another field of said another packet as will be disclosed later in more detail.

Figure 3A:
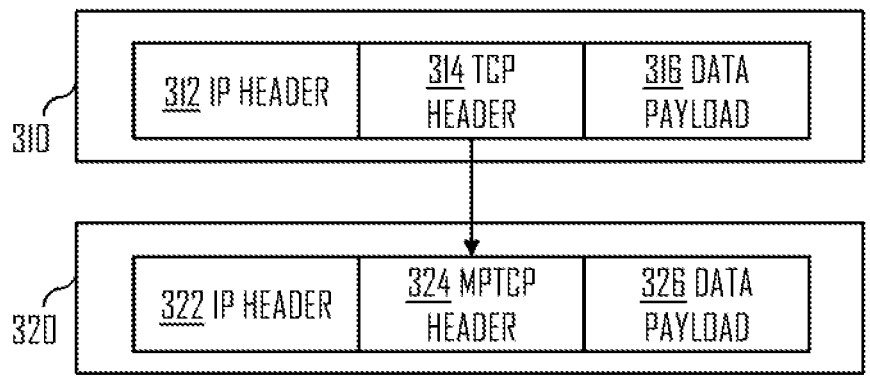
FIGS. 3A, 3B, 3C, 3D, 3E, 4A, 4B, 4C, 4D, 4E illustrate some embodiments.

FIGS. 3A, 3B, 3C, 3D, and 3E illustrate some example embodiments. FIG. 3A illustrates conversion of a first packet 310 into a second packet 320, wherein in the example the first packet 310 is a TCP packet and the second packet 320 is a MPTCP packet. So, the NAT 180 may receive the first packet 310 from a non-MPTCP device, such as from the server 170. The first packet 310 may comprise an Internet Protocol (IP) header 312, TCP header 314 and data payload 316. The data payload part 316 may not necessarily be used in case the first packet is a control packet. However, in case the first packet is a data packet, the data payload part 316 may be used to carry data. The conversion, by the NAT 180, may comprise copying an information element of the TCP header 314 into an information element of a header of the second packet 320. In this example, information from the TCP header 314 may be copied (not necessarily all information but some) to the MPTCP header 324 of the second packet. The data payload 326 may be essentially the same as the data payload 316. IP header 322 may change depending on the routing criterion. In the simplest form, the converting the first packet 310 into the second packet 320 may comprise copying information from the TCP header 314 into some other element of the same header 314. This may logically generate another data packet (i.e. the second data packet 320). However, it is possible to utilize more complex conversion if need be. It is also pointed out that although conversion from TCP packet into a MPTCP packet is shown, the conversion may be performed from MPTCP packet into TCP packet.

Figure 3B:
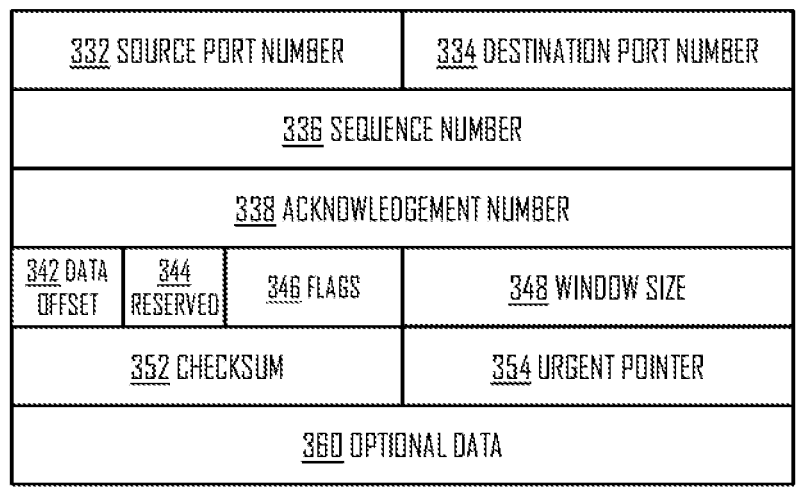

FIG. 3B shows a more detailed structure of a header of a packet (e.g. first packet 310 and/or second packet 320) according to an embodiment. The header may comprise fields or elements for source port number 332 (e.g. 2 bytes), destination port number 334 (e.g. 2 bytes), sequence number 336 (e.g. 4 bytes), acknowledgement number 338 (e.g. 4 bytes), data offset 342 (e.g. 4 bits), reserved 344 (e.g. 3 bits, flags 346 (e.g. 9 bits), window size 348 (e.g. 2 bytes), checksum 352 (e.g. 2 bytes), urgent pointer 354 (e.g. 2 bytes), and/or optional data 360 (e.g. 0-40 bytes).

Regarding a TCP packet, the sequence number element 336 (may also be referred to as sequence number element) may comprise and/or indicate TCP packet sequence number. For example, a transmitter (e.g. the non-MPTCP device) may generate the TCP packet and indicate TCP packet sequence number in the element 336. Thus, when the NAT 180 receives said packet for forwarding, the NAT 180 may obtain the sequence number from the element 336.

Figure 3C:
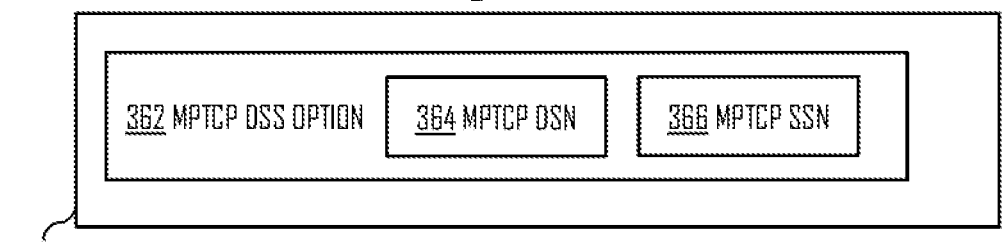

Regarding an MPTCP packet, the optional data 360 may comprises a data sequence signal, DSS, option element 362 as shown in the example of FIG. 3C. Said MPTCP DSS option element 362 may comprise MPTCP data sequence number (DSN) field or element 364 and/or MPTCP subflow sequence number (SSN) field or element 366. The MPTCP DSS option element 362 may be used to indicate the sequence number of the MPTCP packet when MPTCP is utilized, for example, by the MPTCP-UE 110.

So, it is noted that a TCP packet and an MPTCP packet may be quite similar also regarding their header elements or fields. The MPTCP packet may, compared with TCP packet, comprise at least the MPTCP DSS option element 362 to indicate the MPTCP sequence number(s).

Referring to FIG. 3B, port numbers may be processed as part of the native NAT operation and hence the MPTCP/TCP translation function may ignore them. Hence, the MPTCP/TCP translation may comprise primarily in relating the single-flow TCP sequence numbers with the Data Sequence Numbers in MPTCP DSS option). As these two cumulative indicators are equivalent from the point of view of the application layer, simple copying (e.g. one-to-one mapping) may be used in both original (i.e. initial) data transmissions and re-transmissions.

So, according to an embodiment, the first header element is one of a DSS option element 362 and a sequence number element 336, and the second header element is the other of said elements 362, 336. For example, if the first packet is a TCP packet and it needs to be translated or converted into a MPTCP packet, the sequence number of the TCP packet indicated in element 336 may be copied into MPTCP DSS option element 362. More particularly, the sequence number (i.e. obtained from a sequence number element or field of the header) may be copied into the MPTCP DSN element 364. In case the first packet is a MPTCP packet that needs to be converted or translated into a TCP packet, the contents (i.e. sequence number) of the MPTCP DSN element 364 may be copied into the sequence number element 336 of the TCP packet. Once, the copying is performed, the generated and/or translated second packet may be transmitted to the target device.

Regarding some other elements or fields the TCP and/or MPTCP packet, the following rules may apply when performing the conversion from TCP packet to MPTCP packet and/or vice versa:

Flags 346 & Timestamp options may be copied directly without any modification;

Window size 348—The server-side TCP (i.e. non-MPTCP device) receiver window (RWND) is advertised as the sum rate of all the MPTCP subflows, or as the minimum/maximum RWND across the MPTCP subflows multiplied by the number of active MPTCP subflows. If the TCP RWND scaling beyond the default 16 bits range is needed, one can use the standard TCP window scale option. However, the Maximum Segment Size may not be changed to avoid IP fragmentation;

Checksum 352—This value may be re-calculated for every packet as part of the native NAT operation, and the MPTCP/TCP conversion/translation function may deliberately ignore this element. So, although the value may be recalculated, the entity performing the recalculation may be the NAT and not the MPTCP/TCP conversion/translation function; and/or Selective acknowledgement (SACK)—in general, the NAT may translate connection-level MPTCP SACK into TCP level SACK based on the MPTCP/TCP translation logic (i.e. the MPTCP DSS-vs-TCP SEQ mapping).

So, according to an example embodiment, in addition to copying sequence number from one field to another field to generate a translated or converted packet, the network element (e.g. network element 400) copies one or more different header fields or elements (or simply their contents) to the translated or converted packet's header. Numerous examples were given above. After all header fields that need to be copied are copied, the network element may (re)calculate the checksum of the packet and copy it to the checksum field or element in the header of the translated or converted packet (i.e. second packet). So, two or more header fields or elements of the first packet may be copied into the second packet's header.

Figure 3D:
Figure 3E:
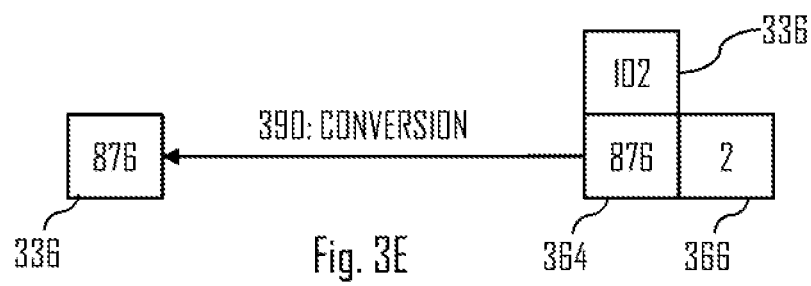

FIG. 3D shows the conversion or translation 370 from a TCP packet into a MPTCP packet. The conversion 370 comprises copying a sequence number of sequence number element 336 of the TCP packet into the MPTCP DSN element 364 of the generated MPTCP packet. So, in this example the sequence number is 874 which is copied from one header element to another header element. In FIG. 3E, an opposite conversion or translation 390 is shown, i.e. from MPTCP packet into a TCP packet: the MPTCP DSN element 364 may be copied to the sequence number element 336 of the generated TCP packet (i.e. sequence number 876).

Regarding the MPTCP packet, the sequence number element 336 may be used to indicate TCP sequence number. MPTCP may utilize two or more TCP subflows, and hence the TCP sequence number may be indicated.

Regarding the MPTCP packet, the MPTCP SSN element 366 may be used to indicate MPTCP subflow sequence number.

According to an embodiment, the converting the first packet into the second packet further comprises: recalculating a checksum 352 of the second packet after the copying the obtained sequence number into the second header element. That is, the checksum may need to be recalculated as the copying the sequence number may change the structure of the packet. I.e. without the recalculation, the receiver may determine that the packet is corrupted as some data is changed without recalculating the checksum. The checksum 352 may thus be utilized to verify that the packet has been transferred correctly. The checksum 352 may comprise IPv4 and TCP checksum, or only TCP checksum if IPv6 is used. For example, IPv4 checksum may be computed based on the IP header data and TCP checksum may be computed based on selected fields of the TCP payload as well as the TCP header (so-called pseudo header). Furthermore, the checksum may be recalculated after all needed header fields or elements are copied.

Figure 4A:
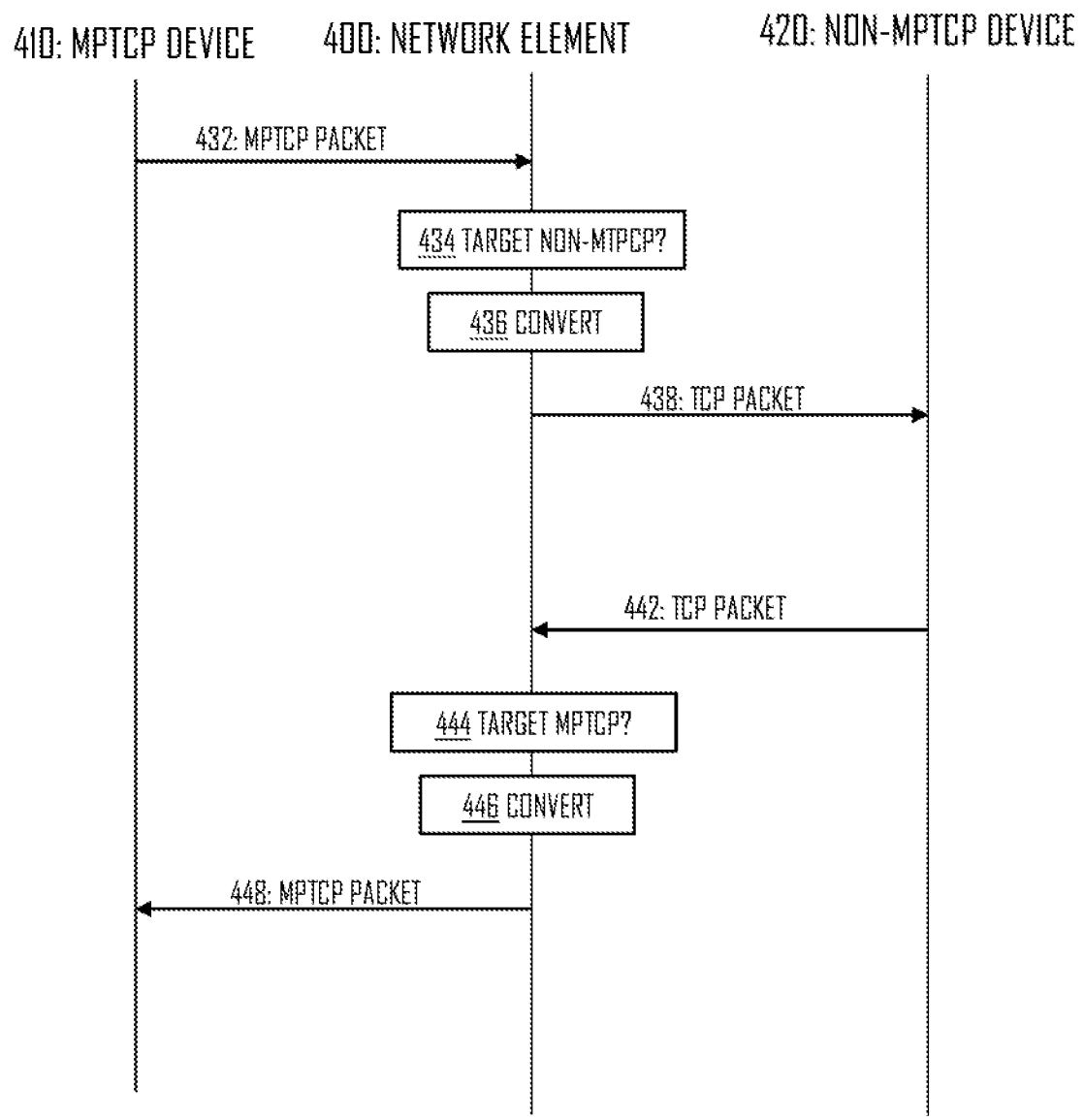

FIG. 4A illustrates a signal diagram according to an embodiment. Referring to FIG. 4A, MPTCP device 410 (e.g. UE 110), network element 400 (e.g. the apparatus performing steps of FIG. 2, such as NAT 180) and non-MPTCP device 420 (e.g. non-MPTCP or TCP-only server computer, such as the server 170) are shown.

In block 432, the MPTCP device 410 transmits an MPTCP packet targeted to the non-MPTCP device 420. The MPTCP device 410 may not have information about the device 420 being a non-MPTCP device, and thus it may use the MPTCP transmission. The network element 400 may receive the MPTCP packet, and in block 434 detect/determine that the device 420 is not a MPTCP device. The detection may be based on previously acquired information from the device 420. Upon detecting and/or in response to detecting that the device 420 is a non-MPTCP device, the network element 400 may initiate converting (block 436) the MPTCP packet into a TCP packet as discussed above in more detail. Once the packet has been converted (i.e. logically from MPTCP packet into a TCP packet), the TCP packet may be forwarded to the non-MPTCP device 420 (block 438).

The other way around, the non-MPTCP device 420 may transmit a TCP packet targeted to the MPTCP device 410 (block 442). In block 444, the network element 400 may detect/determine that the target device 410 supports MPTCP and/or has established an MPTCP session with the network element 400 or with an entity in which the network element 400 is comprised in. For example, the MPTCP session comprising two or more subflows may be established between the MPTCP device 410 and the NAT 180 comprising the network element 400. Upon detecting and/or in response to detecting that the device 410 is a MPTCP device and/or there is an active MPTCP session, the network element 400 may initiate converting (block 446) the TCP packet into a MPTCP packet as discussed above in more detail. Once the MPTCP packet has been generated, the MPTCP packet may be forwarded to the MPTCP device 410 via one of the MPTCP subflows of the MPTCP session.

For example, the MPTCP session may refer to the MPTCP connection 192 utilizing at least the connections 132 and 142 (e.g. one is cellular, such as LTE, and one is WiFi connection). I.e. MPTCP session may also be referred to as MPTCP connection 192 comprising plurality of subflows on plurality of connections 132, 142.

It is pointed out that the solution does not require converting both TCP and MPTCP packets, but may enable both conversion as pointed out above.

Figure 4B:
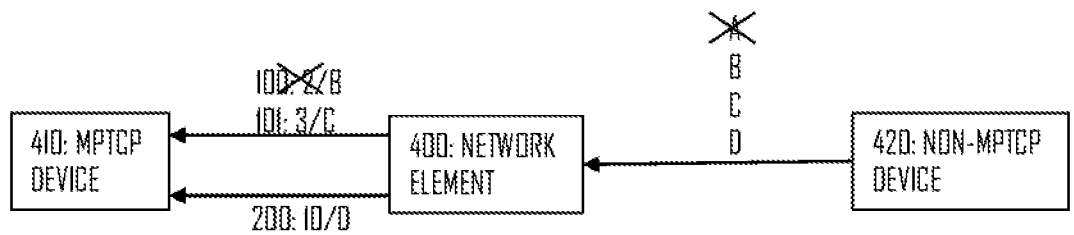
Figure 4C:
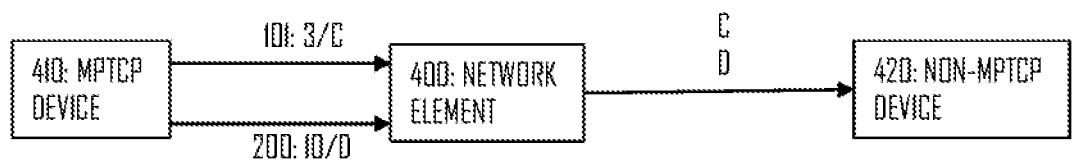
Figure 4D:
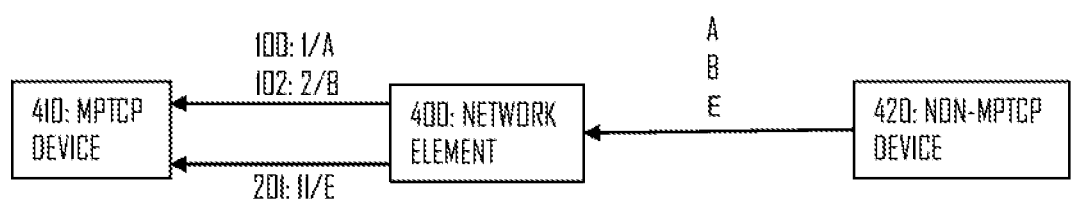
Figure 4E:
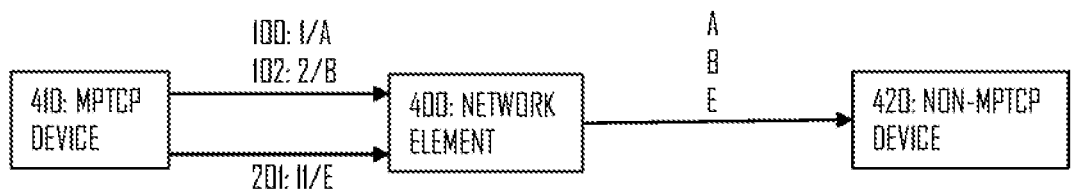
Figure 5:
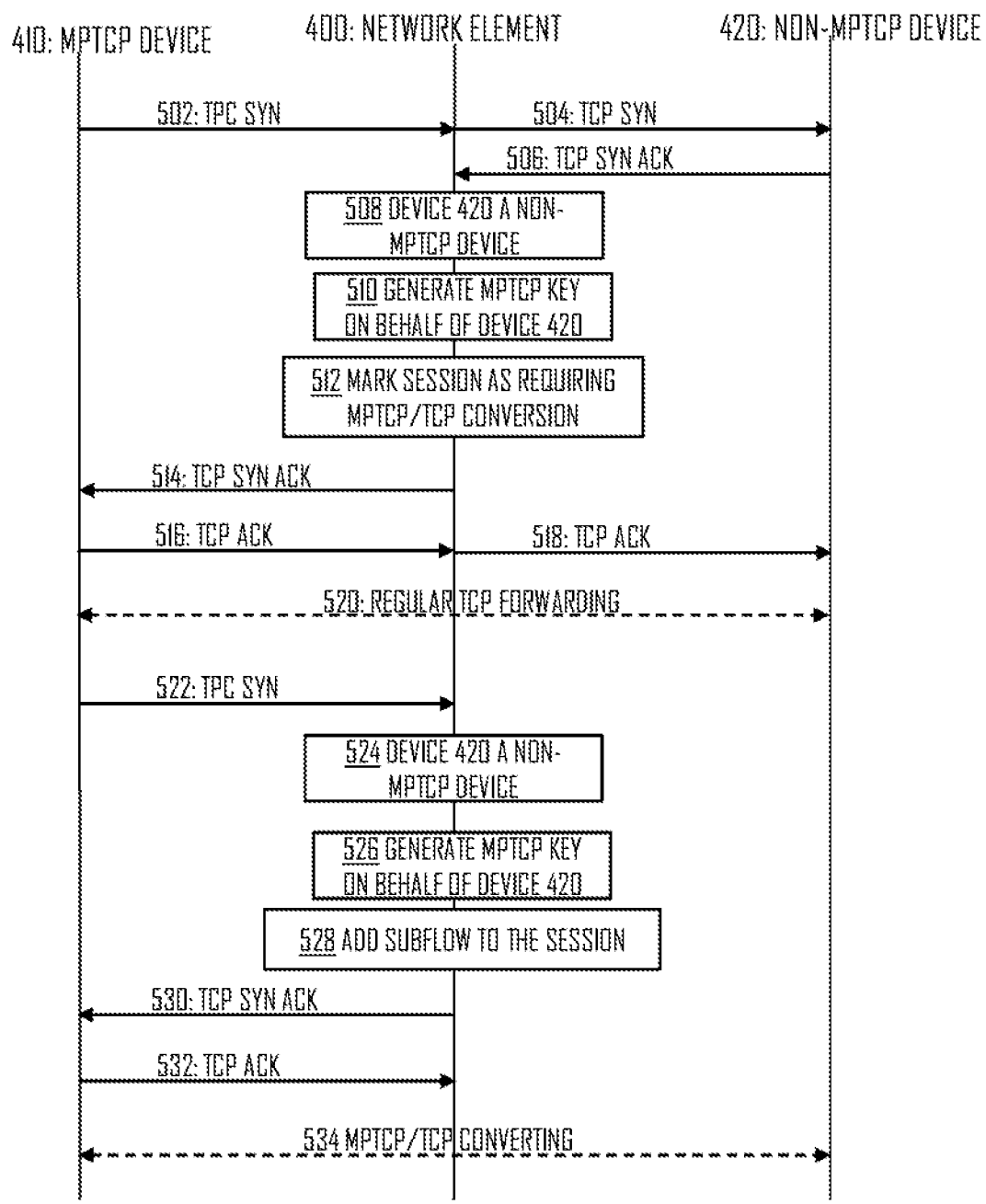
FIG. 5 illustrates a signal diagram according to an embodiment.

Before looking more closely on embodiments of FIGS. 4B, 4C, 4D, and 4E, let us discuss some example embodiments with reference to FIG. 5 illustrating a signal diagram.

According to an embodiment with reference to FIG. 5, the network element 400 is configured to trigger converting 534 the first packet into the second packet if a plurality of MPTCP subflows are utilized either by the first device or by the second device in a connection between the first device and the second device. So, for example, if the first device is the MPTCP device 410 and MPTCP device 410 has established at least two MPTCP subflows in a connection with the non-MPTCP device 420, the network element 400 may convert the TCP packets into MPTCP packets and MPTCP packets into TCP packets in the connection. However, if a plurality of MPTCP subflows are not utilized either by the first device or by the second device in the connection between the first device and the second device, the packets may be forwarded according to TCP between the first device and the second device without performing the converting 534 (i.e. between the MPTCP device 410 and the non-MPTCP device 420). So, for example, if there is only one MPTCP flow established, the converting may not be performed and the packets may simply be forwarded 520 according to TCP forwarding rules. Using such approach may further save resources as the MPTCP/TCP converting may be triggered on in response to having more than one MPTCP subflow in which case there may be no need to perform the conversion. I.e. one MPTCP subflow may essentially be or equal to a TCP flow.

Referring to FIG. 5, according to an example embodiment, the network element 400 is further configured to forward a message from the first device (i.e. MPTCP device 410) to the second device (i.e. non-MPTCP device 420), the message indicating a need to establish a first MPTCP subflow. The received message may be indicated as TCP SYN 502 and the forwarded message as TCP SYN 504 in FIG. 5. So, simple forwarding may be utilized. The TCP SYN 502 and 504 may comprise a first MPTCP key and an indication that the device 410 is MPTCP capable. The network element 400 may cause storing an indication about the device 410 being a MPTCP capable device.

It is pointed out that the network element 400 does not necessarily forward messages, but performs the translation/conversion between MPTCP and TCP. The forwarding may be performed by a separate NAT, for example. However, both functionalities can be performed by same logical entity or device and hence for simplicity reasons only network element 400 is shown in FIG. 5. As explained, the network element 400 may be or be comprised in, for example, the NAT 180.

The network element 400 may receive, from the second device to the first device, a response message indicating that the second device does not support MPTCP (e.g. TCP SYN acknowledgement (ACK) 506). For example, the TCP SYN ACK 506 may indicate that the device 420 is not MPTCP capable (i.e. is TCP-only device).

Upon receiving the response message (e.g. TCP SYN ACK 506), the network element 400 may prevent forwarding said response message to the first device and stores an indication about the second device not supporting MPTCP (block 512). So, the TCP SYN ACK 506 may not be forwarded to the MPTCP device 410 as said message indicates that the device 420 is not MPTCP capable.

In 514, the network element 400 may transmit an acknowledgement to the first device about the first MPTCP subflow; and utilize said indication (i.e. block 512) in forwarding packets between the first device and the second device. To be more precise, in block 508, the network element 400 may detect that the device 420 is non-MPTCP device, and generate, in block 510, a second key (e.g. MPTCP key) on behalf of the non-MPTCP device 420. The second key may be transmitted to the MPTCP device 410 in the response message (e.g. TCP SYN ACK 514). The response message may further indicate that the MPTCP is supported. Thus, the MPTCP device 410 may become aware that the MPTCP can be used in the connection with the non-MPTCP device 420. The MPTCP device 410 may further respond with TCP ACK 516 which may further be forwarded (i.e. 518) to the non-MPTCP device 420. The TCP ACK 516, 518 may comprise another key or combination of the first key and the second key. So, by preventing the forwarding the message 506 and generating the second key on behalf of the non-MPTCP device 420, the network element 400 may enable the non-MPTCP device 420 to communicate with the MPTCP device 410.

As discussed, if only one MPTCP subflow is added, the session may be marked as requiring MPTCP/TCP conversion (block 512). The conversion may be triggered once at least one other MPTCP subflow is added (i.e. at least two parallel MPTCP subflows). So, in 520, packets may be forwarded subject to normal NAT operation without the packet converting procedure, by the network element 400, between the first device (i.e. the MPTCP device 410) and the second device (i.e. the non-MPTCP device 420).

According to an example embodiment and with reference to FIG. 5, the network element 400 (or NAT in more general terms) may further receive a message (e.g. TCP SYN 522) from the first device (i.e. the MPTCP device 410) indicating a need to establish a second MPTCP subflow; transmit an acknowledgement (e.g. TCP SYN ACK 530) to the first device about the second MPTCP subflow at least on the basis of the stored indication that the second device does not support MPTCP (see block 512); and trigger, based at least on the use of the first and second MPTCP subflows, converting MPTCP packets, from the first device to the second device, into TCP packets, and converting TCP packets, from the second device to the first device, into MPTCP packets (MPTCP/TCP converting 534).

So, more precisely, in block 524 the network element 400 may detect that the device 420 is non-MPTCP device based on the indication made earlier about the device 420 (see block 512). Thus, the network element 400 may not forward the TCP SYN 522 to the device 420, but generate a fourth MPTCP key on behalf of the device 420. The TCP SYN 522 may comprise a third MPTCP key. In block 528, the network element 400 may add the second subflow to the session (i.e. comprising now both the first and second MPTCP subflows). Hence, the converting procedure of 534 may commence. The network element 400 may ACK the second subflow addition to the session by transmitting the message 530 to which the MPTCP device 410 may respond with TCP ACK 532.

In response to removing a subflow from the MPTCP session, the network element 400 stops the converting operation (i.e. 534) if there is only one MPTCP subflow in the session or if there are not a plurality of MPTCP flows in the session. Hence, the forwarding may commence according to regular TCP rules (i.e. 520).

According to an embodiment, the network element 400 is referred to as MPTCP/TCP converter or translator.

So, in FIG. 5, first MPTCP flow establishment was indicated in blocks 502-518 and second MPTCP flow establishment was indicate in blocks 522-532. Before the second flow is established, the network element 300 may forward MPTCP packets via regular TCP rules as indicated with arrow 520. Once the second subflow is added to the MPTCP session between the MPTCP device 410 and the network element 400, the network element may commence the MPTCP/TCP converting as indicated with arrow 534. The session between the MPTCP device 410 and the network element 400 may actually refer to session between the MPTCP device 410 and the non-MPTCP device 420. However, as the non-MPTCP device cannot operate by utilizing MPTCP, the MPTCP session may be understood to be established between the MPTCP device 410 and the network element 400, whereas a normal or regular TCP session is established between the network element 400 and the non-MPTCP device 42. This enables the non-MPTCP device 420 to communicate with the MPTCP device 410. Unlike in a conventional MPTCP/TCP proxy (e.g. proxy 150), there may be no need to implement TCP congestion control, flow control, re-transmissions and/or other mechanisms. Hence, simple header copying as explained above may suffice.

Let us then look closer at FIGS. 4B to 4E illustrating forwarding and converting TCP and/or MPTCP packets transmitted between devices 410 and 420. Looking first at FIG. 4B, the non-MPTCP device 420 (e.g. server) transmits TCP packets, having sequence numbers A, B, C, and D, to MPTCP device 410. As discussed above, the network element 400 may work as a router (e.g. NAT) between the non-MPTCP device 420 and the MPTCP device 410 (e.g. client). The TCP packets A, B, C, and D are numbered with TCP sequence numbers (TCP SEQ #, e.g. field or element 336) and the network element 400 may directly copy them into the MPTCP DSN element 364 of the MPTCP DSS option 362 when generating the TCP headers of the MPTCP device subflows. In accordance with the MPTCP standard, the MPTCP DSS option may also indicate the subflow sequence number (i.e. MPTCP SSN # (i.e. MPTCP SSN number)) used for the reconstruction of the original data flow delivered to the application layer. This MPTCP DSS option 362 is then embedded into the header of a subflow TCP packet whose TCP sequence numbers (TCP SEQ #) is chosen independently from the MPTCP SSN. The subflow TCP packet refers to a MPTCP packet that is transmitted via one of the subflows. As TCP sequence numbers are only of local subflow significance according to the MPTCP standard, the network element may reuse unacknowledged sequence numbers.

In the examples of FIGS. 4B to 4E, the MPTCP packets (or subflow TCP packets) are indicated to be transmitted via two different subflows. However, more than two subflows may be used. The MPTCP packets are indicated as follows: TCP sequence number 336: MPTCP SSN 366/MPTCP DSN 364. So, for example, TCP packet having sequence number B is translated or converted into MPTCP packet having TCP sequence number 100, SSN=2 and DSN=B. This logic applies to all packets indicated in FIGS. 4B to 4E.

Packet having sequence number A (or simply packet A) is not successfully received by the network element 400. Hence, the network element 400 may only convert packet B, C and D. The TCP sequence numbers for MPTCP packets 100, 101, and 200 may be selected arbitrarily, for example. The SSNs for MPTCP packets 100, 101, and 200 may be selected arbitrarily, for example. However, as explained, the TCP packet TCP sequence numbers may be directly copied to the DSN elements or fields.

In FIG. 4B, the network element 400 forwards translated packets B, C, and D to the MPTCP device 410 which does not successfully receive packet B. The packets may be transmitted via two MPTCP flows as indicated with arrows. It is noted that the packet A is not forwarded at all at this point as it was not successfully received. According to an embodiment, the network element 400 does not request retransmissions. That is, the network element 400 may only perform routing and conversion operations.

According to an embodiment, the network element 400 performs retransmissions requests. That is, the network element 400 can also pro-actively request on behalf of the target receiver (e.g. device 410) re-transmissions of data lost on the connection between the device 420 and the network element 400 (e.g. without forwarding any subsequent request of the same type by the device 410). In similar manner, the network element 400 may cache forwarded data and retransmit on behalf of the server. Both techniques may reduce the end-to-end re-transmission delay and, given the TCP mechanics, may also improve the overall throughput.

In FIG. 4C, the MPTCP device 410 acknowledges the received packets B and D via two different subflows. The packets may be acknowledged, for example, via the same subflow which was used to transmit the packet. However, it may be possible to utilize different subflow. The network element 400 may forward the acknowledgements to the non-MPTCP device 420. Thus, the non-MPTCP device 420 may become aware that packets A and B need to be retransmitted as they were not received by the MPTCP device 410. It is noted that the ACKs may also need to translated/converted from MPTCP packets into TCP packets. I.e. the ACKs may be MPTCP and TCP packets without payload, for example.

In FIG. 4D, the non-MPTCP device 420 may retransmits packets A and B. Further, the retransmission of A and B may further comprise transmitting one or more new packets, such as packet E. The network element 400 may convert said packets into MPTCP packets and forward them to the device 410. As shown, TCP sequence number 100 is reused as packet B was not successfully received in FIG. 4B. Moreover, the number 100 is now for packet A, and number 102 is used for packet B. So, the MPTCP packets may reuse the unacknowledged TCP sequence number according to an embodiment.

In FIG. 4E, the MPTCP device 410 may acknowledge the received packets A, B, and E, and the ACKs may yet again be converted and forwarded as TCP packets to the device 420.

According to an embodiment, in response to the transmitting a converted packet to the MPTCP device 410, receiving, from the MPTCP device 410, an acknowledgement or non-acknowledgement regarding the converted packet; and in response to receiving the acknowledgement or non-acknowledgement according to the MPTCP, forwarding the acknowledgement or non-acknowledgment to the non-MPTCP device 420, wherein the acknowledgement or non-acknowledgement is converted into TCP packet before the forwarding. Similar logic may apply vice versa, i.e. converting TCP ACKs or NACKs into MPTCP ACKs or NACKs before forwarding them to the MPTCP device 420.

According to an embodiment, the network element 400 selects an MPTCP subflow amongst a plurality of MPTCP subflows for transmitting a converted packet. For example, the network element 400 may select subflow 132 or 142 for transmitting packet B and the other for transmitting packet C. For example, it may be theoretically irrelevant over which path or subflow a re-transmission occurs. This would allow an entirely state-less operation of the MPTCP/TCP translation function. However, depending on the deployment scenario, the network element 400 may choose to retransmit data on the original subflow (e.g. to preserve the subflow integrity in the presence of middle boxes that replay old data and/or reject subflows with sequence number holes) in which case basic packet-to-flow accounting may be maintained. So, packet B may be retransmitted via the same subflow via which it was initially transmitted. However, the retransmission path may be selected differently, i.e. different subflow.

According to an embodiment, the MPTCP subflow for transmitting a converted packet is selected amongst a plurality of subflows, based on one or more measurements on said subflows, for forwarding the packet. Alternative and/or additional criterion may include packet priority information. That is, a packet with higher priority may be transmitted via a first subflow and a packet with less priority may be transmitted via a second subflow, wherein the first subflow is determined to be more reliable, e.g. based on said measurement(s), compared with the second subflow. So, the packet(s) having lower priority may be transmitted via less reliable subflow, for example.

According to an embodiment, said one or more measurements comprise a round-trip-time (RTT) measurement. For example, RTT of each subflow may be measured and the subflow having lowest RTT may be selected. For example, the network element 400 may record RTT based on forwarding (i.e. transmitting a packet) and receiving an ACK from the target receiver. A smoothing function may be used to obtain final RTT estimates that may be used to select the link with the lowest RTT. The network element 400 may send some packets over the link with higher RTT in order to update its RTT estimates. For example, such RTT re-estimation may be performed on regular intervals. For example, the RTT of unused subflows may decrease if said subflow is not used for transmitting packets. Hence, re-measurement or re-estimation may be beneficial from time to time.

According to an embodiment, said one or more measurements comprise a signal quality and/or signal strength measurement. One way to schedule downlink packets, by the network element 400, could be based on wireless signal strength. Herein, the network element 400 may record the signal strength of each MPTCP subflow, and uses an appropriate scheduling mechanism. For example, the subflow associated with the highest signal quality and/or strength may be selected for transmitting a packet.

Figure 6:
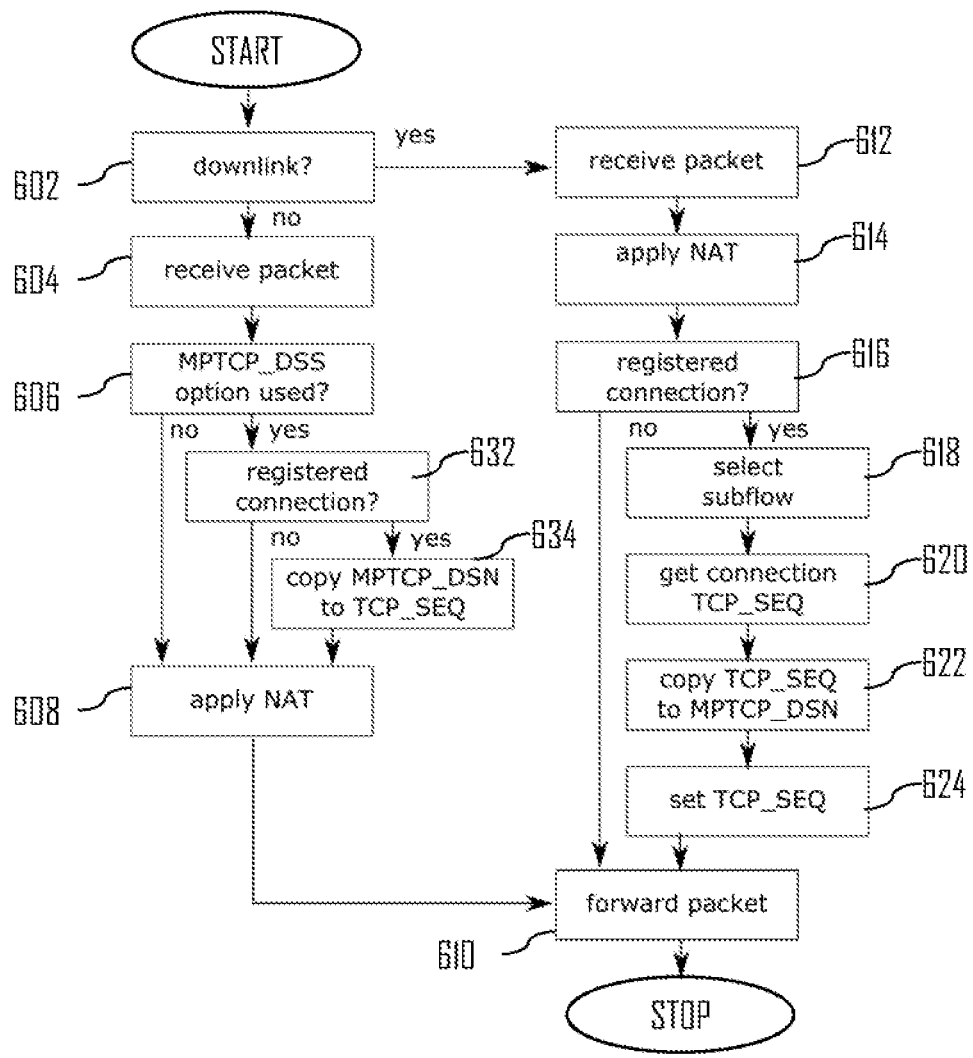
FIGS. 6 and 7 illustrate flow diagrams according to some embodiments.

FIG. 6 illustrates an embodiment in which also the above described subflow selection step 618 is shown. Referring to FIG. 6, the method may be performed by the network element 400, for example. At 602, if a packet is downlink (i.e. from server to client device), the method may continue to block 612. If packet is uplink (i.e. from client device to server), the method may continue to block 604. According to an embodiment shown in FIG. 6, the downlink packets are TCP packets and uplink packets are MPTCP packets.

In block 612, the TCP packet is received and in block 614 NAT is applied. "apply NAT" may comprise changing the source and/or destination address and port, depending on the direction of the packet. If there is a registered MPTCP connection, the process may continue from block 616 to block 618, otherwise the process may continue to block 610 from block 616. Also, in block 616 it may be determined whether there is at least two subflows in the registered connection. If not, the process may continue to block 610. If there is at least two subflows, the process may continue to block 618.

In block 618, a subflow for transmitting the packet may be selected. In block 620, TCP packets TCP sequence number is obtained, and in block 622 copied to the MPTCP DSN element or field. In block 624, the generated MPTCP packets TCP sequence number is set. Similarly, the SSN number may be set. From block 624, the process may continue to block 610 in which the packet may be forwarded.

In block 604, an uplink packet may be received. In block 606, it may be determined whether the packet has MPTCP DSS option used. If MPTCP DSS option is not used, the process may continue directly to block 608 and from there to forwarding the TCP packet. However, if MPTCP DSS option is used, the process may continue to block 632. In block 632, it is determined whether there is a registered MPTCP connection comprising at least two subflows. If there is, the process may continue to block 634, otherwise the process may continue to block 608. In block 634, the MPTCP DSN element is copied to the TCP sequence number element to obtain a TCP packet which may be forwarded in block 610. Hence, in block 634, the packet is MPTCP packet that is converted into the TCP packet by copying the DSN element into the sequence number element.

According to an embodiment, the copying the MPTCP DSN element into the sequence number element comprises overwriting the sequence number field.

According to an embodiment, the copying the sequence number element into the MPTCP DSN element comprises overwriting the MPTCP DSN element.

Figure 7:
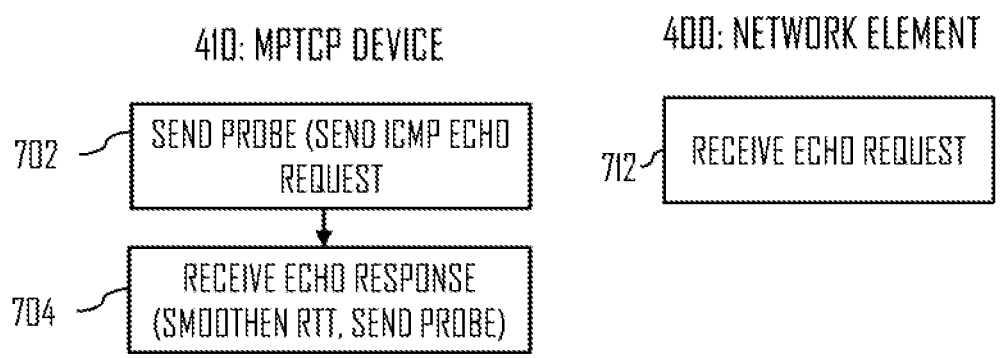

Both the appyNAT (614, 608) and select subflow (618) functions can be driven by network-layer (L3) multi-path decision-making. Regarding the subflow selection 618, the system may utilize Internet control message protocol (ICMP) based probing and scheduling. For example, and with reference to embodiment of FIG. 7, the MPTCP capable client device 410 may send an ICMP probe (e.g. echo request, such as ICMP ECHO request), to the network element 400, and may further record the transmission time (e.g. timestamp) (block 702). The network element 400 may receive the echo request in block 712 and respond to the echo request by transmitting an echo response (e.g. ICMP ECHO response) to the device 410. When the device 410 receives the echo response from the network element 400 (block 704), it may estimate the RTT (e.g. using RTT sample smoothening to avoid momentary fluctuations). The device 410 may then wait for a pre-defined time interval after the ICMP probe response (i.e. the echo response) was received, and send another ICMP probe when and/or in response to the pre-defined time interval elapses. The second probe may be used to estimate the RTT on the network element 400 side as the (smoothened) difference between the two received consecutive ICMP probes. The advantage of this scheme may be that the element 400 can determine RTTs without actively probing all clients on its own. The RTT from consecutive probes is calculated as the elapsed time between the two probes then the interval is subtracted. The RTT measurements may then be used as scheduling input as described above. Such probes may be transmitted via each subflow so that RTT for each subflow may be determined. So, the device 410 may transmit at least two probes to the network element 400 with a pre-defined time interval between transmitting the two consecutive probes. Based on the received probes and the pre-defined time interval, the network element 400 may determine RTT for that subflow.

Figure 8:
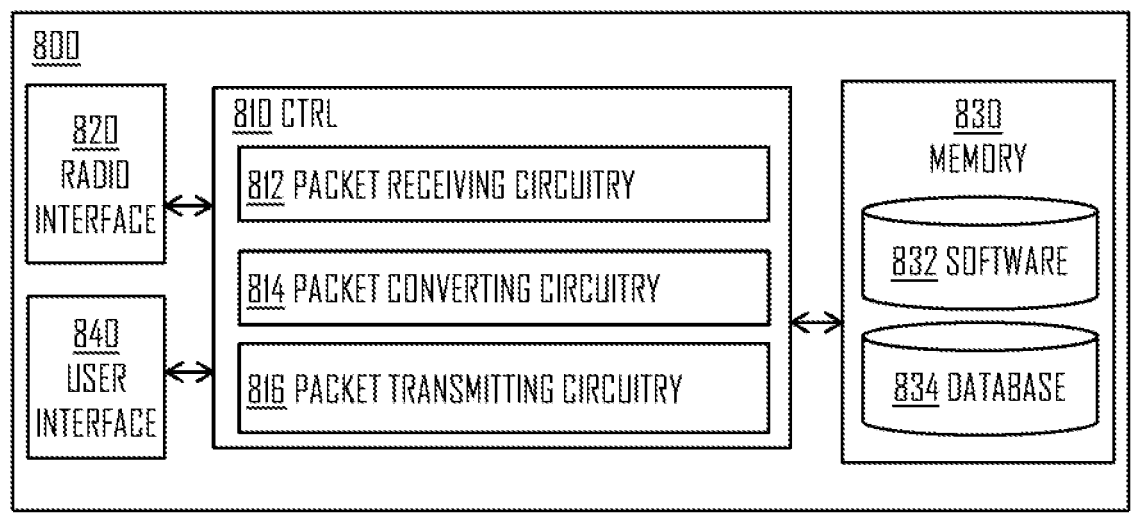
FIG. 8 illustrates an embodiment.

FIG. 8 provides an apparatus 800 comprising a control circuitry (CTRL) 810, such as at least one processor, and at least one memory 830 including a computer program code (software) 832, wherein the at least one memory and the computer program code (software) 832, are configured, with the at least one processor, to cause the respective apparatus 800 to carry out any one of the embodiments described above, such as with reference to FIGS. 1A to 7, or operations thereof.

Referring to FIG. 8, the memory 830 may be implemented using any suitable data storage technology, such as semiconductor based memory devices, flash memory, magnetic memory devices and systems, optical memory devices and systems, fixed memory and removable memory. The memory 830 may comprise a database 834 for storing data. For example, the MPTCP session information (e.g. how many subflows are established in a MPTCP connection) may be stored in the database 834.

The apparatus 800 may further comprise radio interface (TRX) 820 comprising hardware and/or software for realizing communication connectivity according to one or more communication protocols. The TRX may provide the apparatus with communication capabilities to access the radio access network and enable communication between network nodes, for example. The TRX may comprise standard well-known components such as an amplifier, filter, frequency-converter, (de)modulator, and encoder/decoder circuitries and one or more antennas. The TRX may enable the apparatus to communicate according to both the TCP and MPTCP. Hence, the TRX may enable use of multiple communication protocols to enable use of MPTCP, or at least use of multiple connection paths using same communication technology in same TCP connection.

The apparatus 800 may also comprise user interface 840 comprising, for example, at least one keypad, a microphone, a touch display, a display, a speaker, etc. The user interface 840 may be used to control the respective apparatus by a user of the apparatus 800.

In an embodiment, the apparatus 800 may be or be comprised in a base station (also called a base transceiver station, a Node B, a radio network controller, or an evolved Node B, for example). The apparatus 800 may be the network element 400, for example. The apparatus 800 may be comprised in or realize NAT 180, for example. In an embodiment, the apparatus 800 is the MPTCP/TCP translation/converting function 182. In an embodiment, the apparatus 800 is the NAT 180 and comprises the MPTCP/TCP translation/converting function 182.

According to an embodiment, the CTRL 810 comprises a packet receiving circuitry 812 configured at least to cause performing operations described with respect to block 210; a packet converting circuitry 814 configured at least to cause performing operations described with respect to blocks 220, 222, and 224; and a packet transmitting circuitry 816 configured at least to cause performing operations described with respect to block 230.

In an embodiment, at least some of the functionalities of the apparatus 800 may be shared between two physically separate devices, forming one operational entity. Therefore, the apparatus 800 may be seen to depict the operational entity comprising one or more physically separate devices for executing at least some of the described processes. Thus, the apparatus 800 utilizing such shared architecture, may comprise a remote control unit (RCU), such as a host computer or a server computer, operatively coupled (e.g. via a wireless or wired network) to a remote radio head (RRH) located in the base station or network element or NAT. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an embodiment, there is provided a system comprising one or more network elements 400 (or apparatuses 800) and one or more MPTCP device (e.g. device 410, such as a client device)) and one or more non-MPTCP devices (e.g. device 420, such as a server), wherein the one or more network elements are configured to perform converting of packets transmitted between the one or more MPTCP devices and the one or more non-MPTCP devices according to one or more embodiments described above. As noted, the other of the devices may support a first transmission control protocol and the other of the devices a second transmission control protocol, but not the first transmission control protocol. Hence, the converting may be needed between the first and second transmission control protocols.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1A to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1A to 7 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1A to 7, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1A to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory comprising computer program code, wherein the at least one memory and the computer program code are configured, with the at least one processor, to cause the apparatus at least to perform:
   receiving, from a first device, a first packet of a first transmission control protocol, the first packet being targeted to a second device;
   converting the first packet into a second packet of a second transmission control protocol, wherein the first transmission control protocol is multipath transmission control protocol and the second transmission control protocol is transmission control protocol, wherein the converting comprises:
      obtaining a sequence number indicated in a first header element of the first packet, and
      copying the obtained sequence number into a second header element of the second packet;
   transmitting the converted second packet to the second device;
   forwarding a message from the first device to the second device, the message indicating a need to establish a first multipath transmission control protocol subflow;
   receiving, from the second device to the first device, a response message indicating that the second device does not support multipath transmission control protocol;
   upon receiving the response message, preventing forwarding the response message to the first device and storing an indication about the second device not supporting multipath transmission control protocol;
   transmitting an acknowledgement to the first device about the first multipath transmission control protocol subflow; and
   utilizing said indication in forwarding packets between the first device and the second device.

2. The apparatus of claim 1, wherein the converting further comprises:

recalculating a checksum of the second packet after the copying the obtained sequence number into the second header element.

3. The apparatus of claim 1, wherein the at least one memory and the computer program code are configured, with the at least one processor, to cause the apparatus to further perform triggering the converting of the first packet into the second packet if a plurality of multipath transmission control protocol subflows are utilized either by the first device or by the second device in a connection between the first device and the second device.

4. The apparatus of claim 1, wherein the at least one memory and the computer program code are configured, with the at least one processor, to cause the apparatus to further perform when a plurality of multipath transmission control protocol subflows are not utilized either by the first device or by the second device in the connection between the first device and the second device, forwarding packets according to transmission control protocol between the first device and the second device without performing the converting.

5. The apparatus of claim 1, wherein the at least one memory and the computer program code are configured, with the at least one processor, to cause the apparatus to further perform in response to the transmitting the converted second packet to the second device, receiving, from the second device, an acknowledgement or non-acknowledgement regarding the second packet; and in response to receiving the acknowledgement or non-acknowledgement according to the second transmission control protocol, forwarding the acknowledgement or non-acknowledgment to the first device, wherein the acknowledgement or non-acknowledgement is converted from the second transmission control protocol into the first transmission control protocol before the forwarding.

6. The apparatus of claim 1, wherein the at least one memory and the computer program code are configured, with the at least one processor, to cause the apparatus to further perform selecting an multipath transmission control protocol subflow amongst a plurality of multipath transmission control protocol subflows, based on one or more measurements on said subflows, for forwarding the first packet.

7. The apparatus of claim 6, wherein the one or more measurements comprise a round-trip-time measurement.

8. The apparatus of claim 6, wherein the one or more measurements comprise a signal quality or signal strength measurement.

9. The apparatus of claim 1, wherein the at least one memory and the computer program code are configured, with the at least one processor, to cause the apparatus to further perform receiving a message from the first device indicating a need to establish a second multipath transmission control protocol subflow;

transmitting an acknowledgement to the first device about the second multipath transmission control protocol subflow at least on the basis of the stored indication that the second device does not support multipath transmission control protocol; and triggering, based at least on the use of the first and second multipath transmission control protocol subflows, converting multipath transmission control protocol packets, from the first device to the second device, into transmission control protocol packets, and converting transmission control protocol packets, from the second device to the first device, into multipath transmission control protocol packets.

10. A method in a network element for forwarding packets between a multipath transmission control protocol capable device and a non-multipath transmission control protocol capable device, the method comprising:

receiving, from a first device, a first packet of a first transmission control protocol, the first packet being targeted to a second device;

converting the first packet into a second packet of a second transmission control protocol wherein the first transmission control protocol is multipath transmission control protocol and the second transmission control protocol is transmission control protocol, wherein the converting comprises obtaining a sequence number indicated in a first header element of the first packet, and copying the obtained sequence number into a second header element of the second packet;

transmitting the converted second packet to the second device;

forwarding a message from the first device to the second device, the message indicating a need to establish a first multipath transmission control protocol subflow;

receiving, from the second device to the first device, a response message indicating that the second device does not support multipath transmission control protocol;

upon receiving the response message, preventing forwarding the response message to the first device and storing an indication about the second device not supporting multipath transmission control protocol;

transmitting an acknowledgement to the first device about the first multipath transmission control protocol subflow; and utilizing said indication in forwarding packets between the first device and the second device.

11. A non-transitory computer readable medium storing program instructions that, when executed by a processor cause a network element to perform at least:

receiving, from a first device, a first packet of a first transmission control protocol, the first packet being targeted to a second device;

converting the first packet into a second packet of a second transmission control protocol, wherein the first transmission control protocol is multipath transmission control protocol and the second transmission control protocol is transmission control protocol, wherein the converting comprises:

obtaining a sequence number indicated in a first header element of the first packet, and copying the obtained sequence number into a second header element of the second packet;

transmitting the converted second packet to the second device;

forwarding a message from the first device to the second device, the message indicating a need to establish a first multipath transmission control protocol subflow;

receiving, from the second device to the first device, a response message indicating that the second device does not support multipath transmission control protocol;

upon receiving the response message, preventing forwarding the response message to the first device and storing an indication about the second device not supporting multipath transmission control protocol;

transmitting an acknowledgement to the first device about the first multipath transmission control protocol subflow; and utilizing said indication in forwarding packets between the first device and the second device.

12. A system, comprising:

a first device that supports a first transmission control protocol;

a second device that supports a second transmission control protocol;

an apparatus comprising at least one processor, and at least one memory comprising computer program code, wherein the at least one memory and the computer program code are configured, with the at least one processor, to cause the apparatus at least to perform:

receiving, from the first device, a first packet of the first transmission control protocol, the first packet being targeted to the second device;

converting the first packet into a second packet of the second transmission control protocol, wherein the first transmission control protocol is multipath transmission control protocol and the second transmission control protocol is transmission control protocol, wherein the converting comprises obtaining a sequence number indicated in a first header element of the first packet;

copying the obtained sequence number into a second header element of the second packet;

transmitting the converted second packet to the second device;

forwarding a message from the first device to the second device, the message indicating a need to establish a first multipath transmission control protocol subflow;

receiving, from the second device to the first device, a response message indicating that the second device does not support multipath transmission control protocol;

upon receiving the response message, preventing forwarding the response message to the first device and storing an indication about the second device not supporting multipath transmission control protocol;

transmitting an acknowledgement to the first device about the first multipath transmission control protocol subflow; and utilizing said indication in forwarding packets between the first device and the second device.

\* \* \* \* \*